Aug. 7, 1945.  W. BOWER  2,381,639
WHEEL FOR AGRICULTURAL TRACTORS
Filed June 25, 1943  2 Sheets-Sheet 1
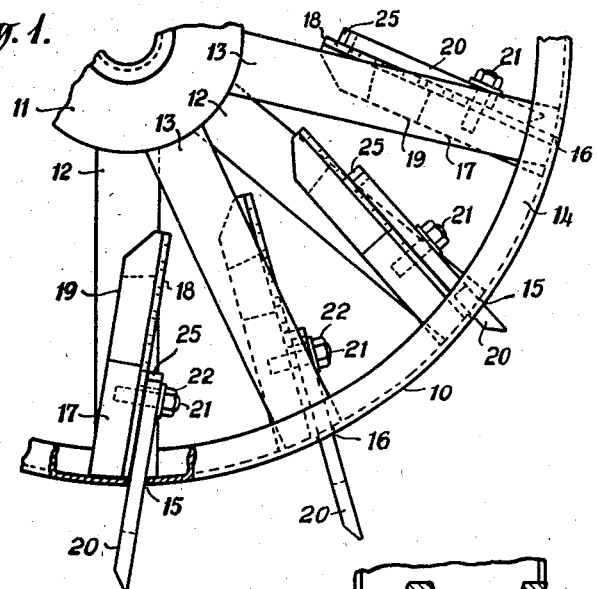
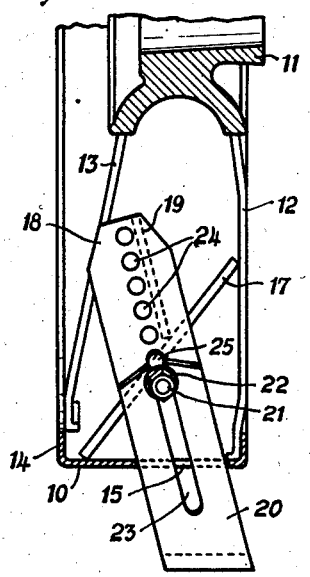
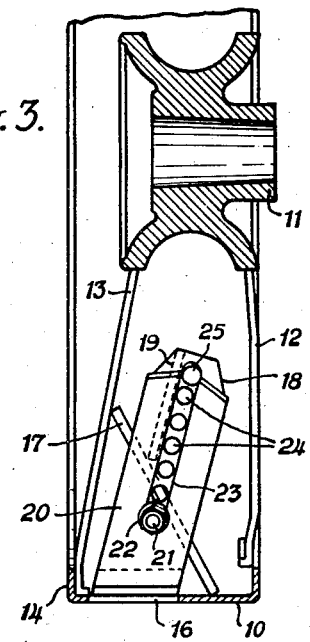
INVENTOR.
WALTER BOWER
By. Francis E. Boyer
ATTORNEY Aug. 7, 1945.  W. BOWER  2,381,639
WHEEL FOR AGRICULTURAL TRACTORS
Filed June 25, 1943  2 Sheets-Sheet 2
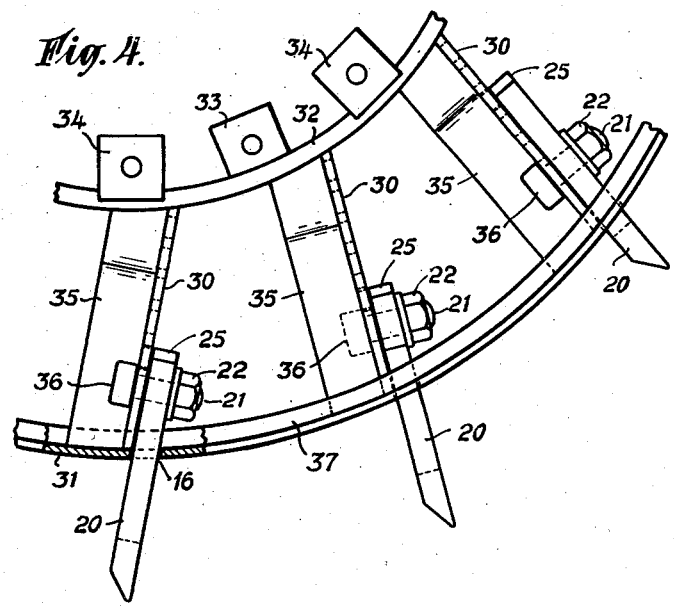
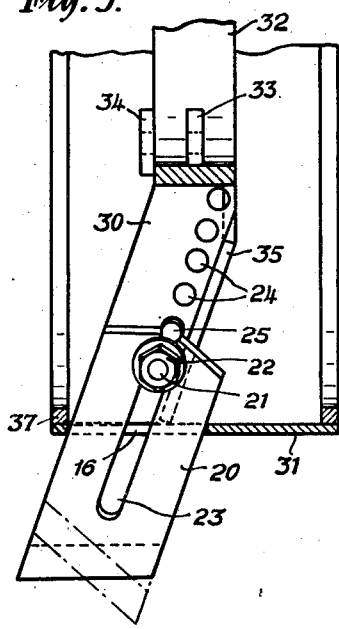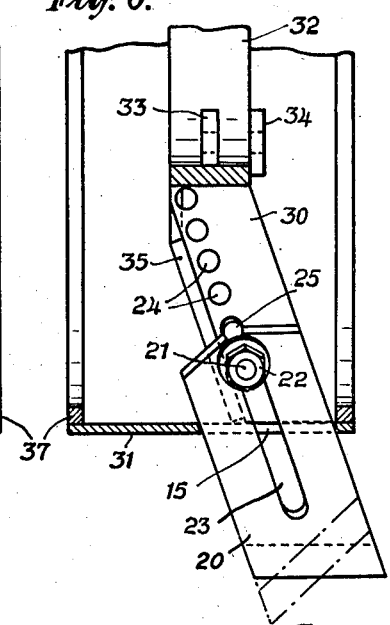
INVENTOR.
WALTER BOWER
By Francis E. Boyer
ATTORNEY Patented Aug. 7, 1945

2,381,639

UNITED STATES PATENT OFFICE 2,381,639

WHEEL FOR AGRICULTURAL TRACTORS

Walter Bower, Barlborough, England

Application June 25, 1943, Serial No. 492,199
In Great Britain November 17, 1942

4 Claims. (Cl. 301—50)

This invention relates to wheels for agricultural tractors and other vehicles.

An object of the invention is to provide an all metal wheel which will be capable of maximum tractive effort over soft ground by the provision of ground engaging sprags extending beyond the boundary of the wheel.

It is also an object of the invention to provide that the sprags shall be retractible to within the boundary of the wheel and thereby permit of use of the wheel over normal road surfaces without damage thereto by the sprags.

Another object of the invention is to provide improved means for mounting the sprags to permit of their manual adjustment so that they can be readily and speedily extended for operative use or retracted into an inoperative position.

A further object is to provide adequate support and firm rigidity to the sprags when in the extended and operative position.

A further object of the invention is to provide a fabricated wheel of robust construction.

Other objects and advantages will be apparent from the following description and the accompanying diagrammatic drawings, in which—

Fig. 1 is an elevation showing a segment only of one form of tractor wheel made in accordance with this invention, a short circumferential length of the wheel rim being shown in section.

Fig. 2 is a half end elevation, partly in section, of the wheel of Fig. 1 except that only two adjacent spokes and one sprag and its supporting means associated with one of the spokes is shown for the sake of clearness, the sprag being shown in the extended position.

Fig. 3 is a somewhat similar view of Fig. 2 but showing the sprag and supporting means therefor adjacent to that depicted in Fig. 2, two spokes again being shown and the sprag being shown retracted.

Figs. 4, 5 and 6 are similar views to Figs. 1, 2 and 3, respectively, of an alternative form of wheel.

In Figs. 1, 2 and 3 an outer member 10 constitutes the rim of the wheel and an inner member 11, spaced therefrom, constitutes an axle receiving boss which is arranged concentric to and slightly to one side of the central plane of the wheel. The rim 10 and axle receiving boss 11 are connected to each other at circumferentially spaced intervals by spokes 12 and 13 at opposite sides of the wheel, the spokes 12 at the one side being staggered with the spokes 13 at the other side of the wheel. The rim 10 is provided with an integral short radial flange 14 and the outer ends of the spokes are secured to the rim inside the angle formed by the flange 14.

The inner ends of the spokes 12 are welded to the boss 11 at the perimeter thereof at one side of the wheel and the spokes 13 are similarly welded to the boss at the other side of the wheel.

The rim is provided with two circumferential series of rectangular shaped openings 15 and 16, the openings 15 being staggered with the openings 16 and the outer ends of the spokes 12 and 13 are secured to the rim in proximity to one end of the openings 15 and 16, respectively.

Disposed across the angle formed by each spoke 12 and 13 is a strut 17 one end being welded to the spoke and the other end to the rim 10 at a point remote from said spoke. This strut 17 forms a support for a sprag carrying plate 18 which is positioned diagonally across and with its rear face in contact with and welded to the adjacent edge of the strut 17. The sprag carrying plate 18 extends from the inner periphery of the rim 10, to which it is welded, to a point distant from the boss 11. The length of the sprag carrying plate 18 projecting inwardly of the wheel and beyond the strut 17, is additionally secured to the said strut by a stiffening plate 19 which is welded along one of its edges to the sprag carrying plate and along one end to the strut. The sprag carrying plates 18 are thereby rigidly fixed to the wheel so that their outer extremities lie one each alongside and in parallel with one of the openings 15 and 16 of the rim. Consequently all the sprag carrying plates 18 are disposed angularly with respect to the rim 10 of the wheel, alternate plates 18, however, being disposed in the opposite sense to the remainder as is apparent in Figs. 2 and 3.

Each sprag carrying plate 18 detachably accommodates a blade of rectangular cross section constituting a sprag 20, the said sprag being disposed face to face upon the plate 18 and consequently in alignment with the opening 15 or 16 as the case may be. For retaining the sprag 20 upon the plate 18 a bolt 21, lying on its side across the strut 17 and welded thereto, passes through the plate 18 where its screw threaded projecting end receives a nut 22. The sprag 20 is provided with a longitudinal slot 23 within the limits of which the said sprag can be adjustably positioned upon the sprag carrying plate 18 and secured by the nut 22. The sprag carrying plate 18 is provided with a plurality of aligned holes 24 which are adapted to be selectively engaged by a short pin 25 secured to and projecting laterally from the sprag 20 at the inner end thereof, thus providing an interlocking hole and pin engagement between the sprag 20 and plate 18 and providing additional support to the sprag. Since the sprag is accommodated upon the plate 20 in alignment with an opening 15 or 16, the said sprag can be positioned upon the sprag carrying plate 18 in an extended position projecting through said opening as shown in Fig. 2 or retracted with its outer end substantially flush with the periphery of the rim 10 as shown in Fig. 3.

It will be noted that the sprags 20 are so disposed that their outer ends, which are bevelled, are disposed parallel with the ground contacting face of the rim 10 and thereby enter the ground, when the sprags are extended, more or less parallel with the surface of the ground.

By transposing adjacent sprags, however, as will be described hereinafter with reference to and as shown in Figs. 4, 5 and 6, said sprags can be disposed so that their outer ends will each enter the ground with a point foremost.

In the alternative form of wheel in Figs. 4, 5 and 6, sprag carrying plates 30 are utilised to also constitute spokes for the wheel by rigidly connecting the rim 31 to an inner member 32 consisting of a ring concentric to the rim. Adjacent sprag carrying plates extend from a common circumferential line on the inner member to opposite sides of the rim in proximity to the sprag accommodating opening 15 or 16. The plates 30 are therefore disposed angularly to the plane of the wheel, alternate plates being disposed in the opposite sense to the remainder.

At circumferentially spaced intervals of the inner member 32, eye-lugs 33 are welded centrally to the inner periphery thereof and spaced axially therefrom and welded to the radial edge of the inner member are similar eye-lugs 34. The wheel can therefore be attached to an axle receiving boss (not shown) by means of either the one series of eye-lugs 33, or the other series of eye-lugs 34, whereby one or the other of two widths of wheel bases can be given to a tractor when the wheels are fitted thereto.

Each of the sprag carrying plates 30 is strengthened by a strut 35 welded to an edge thereof and to the rim 31 and inner member 32 and the said sprag carrying plates are adapted to carry the sprags 20 in very similar manner to that illustrated in Figs. 1, 2 and 3; that is, by the pin and hole engagement 24 and 25 and bolt 21, except that the said bolt is removable and passes through the sprag carrying plate 30 in close enough proximity to the strut 35 so that the square head 36 of the bolt 21 fits close up against the face of the said strut so as to be prevented by the latter from turning when the nut 22 is tightened upon the bolt. Alternatively, the bolt can be used the reverse way so that the nut and head are transposed and the nut could be welded on to the strut for the bolt to be screwed into or out of the nut when adjusting the sprags 20.

In Figs. 5 and 6 the sprags, shown in full lines, are assembled in the same relation to those of Figs. 2 and 3, that is to say, with their bevelled outer ends parallel with the rim 31. By exchanging one for the other the sprags 20 of the two adjacent sprag carrying plates 30 represented in Figs. 5 and 6, it will be seen that the sprags will then be positioned with their outer ends angularly disposed with respect to the rim face for entering the ground point foremost, as indicated in dot and dash lines.

The rim 31 may be strengthened along each circumferential edge by a ring 37 welded thereto.

The sprag carrying plates 18 and 30 in Figs. 1 to 3 and Figs. 4 to 6, respectively, are shown as being disposed at an angle to the plane of the wheel with the sprags supported thereby so as to project with their extremities outside the width of the rim face or tread but the invention is not to be limited in this respect.

As will be seen in Figs. 1 to 6, inclusive, the sprags may each be supported in a plane angularly disposed to and intersecting the central plane of the wheel, each of said sprags being also radial to a centre which is eccentric to the axis of the wheel.

What I claim and desire to secure by Letters Patent is:

1. The combination with a wheel, of a sprag arrangement comprising a series of sprag carrying plates secured to the inner periphery of the wheel rim alternately at opposite sides thereof and adjacent sprag accommodating openings in said rim, said plates extending inwardly from said rim alternately to opposite sides of the wheel and being angularly disposed to and intersecting the central plane of the wheel, means disposed within the wheel for supporting the inner ends of said plates, slotted ground contacting sprags detachably and adjustably mounted on said plates for projection and retraction through said rim openings and having like ground penetrating ends adapted, when the sprags on adjacent ones of said plates are interchanged, to enter the ground at a different angle from that at which they entered the ground previous to their being interchanged, projections on said sprags interengageable with one of a plurality of apertures in said plates for detachably pre-selectively locating said sprags at different positions thereon, and fastening means for securing the sprags to the plates.

2. The combination with a wheel, of a sprag arrangement, comprising a series of sprag carrying plates secured at their outer ends to the wheel rim alternately at opposite sides thereof adjacent sprag accommodating openings in said rim and at their inner ends secured to an axle accommodating member about a common circumferential line thereon, strengthening supports for said plates secured thereto and to said rim and said axle accommodating member, said supports and sprag-carrying plates together constituting the spokes of the wheel, slotted ground contacting sprags detachably and adjustably mounted on said sprag carrying plates for projection and retraction through the rim openings and having like ground penetrating ends adapted, when the sprags on adjacent ones of said plates are interchanged, to enter the ground at a different angle from that at which they entered the ground previous to their being interchanged, projections on said sprags interengageable with one of a plurality of apertures in said plates for preselectively locating said sprags at different positions thereon, and fastening means for detachably securing the sprags to the plates.

3. A wheel and sprag arrangement therefor as claimed in claim 1, said sprag-fastening means being permanently associated with the sprag carrying plates.

4. A wheel and sprag arrangement therefor as claimed in claim 2, said sprag-fastening means being permanently associated with the sprag carrying plates.

WALTER BOWER.